Patented Nov. 25, 1930

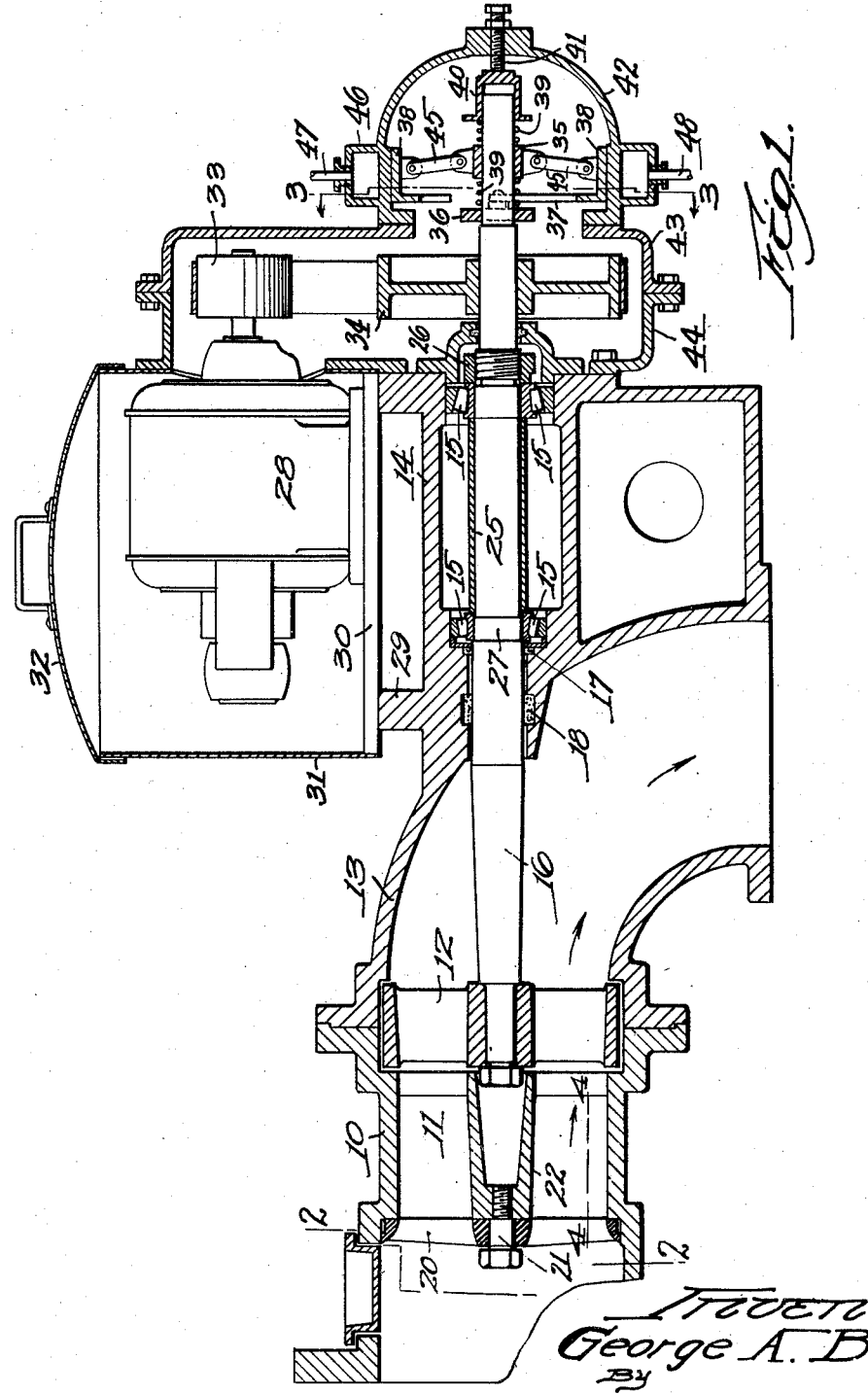

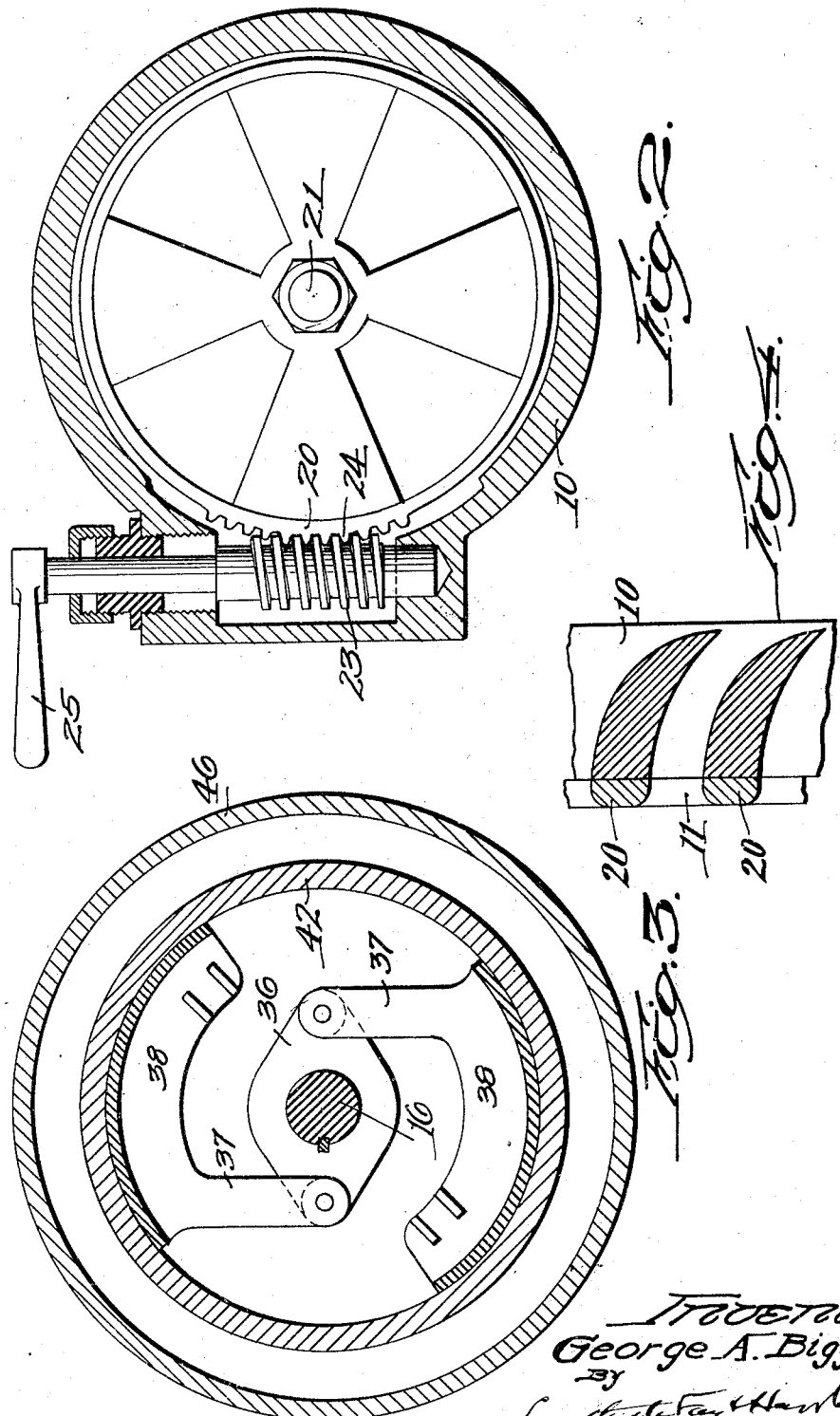

1,782,456

UNITED STATES PATENT OFFICE

GEORGE A. BIGGS, OF ORANGE, MASSACHUSETTS, ASSIGNOR TO RODNEY HUNT MACHINE COMPANY, OF ORANGE, MASSACHUSETTS, A CORPORATION OF MASSACHUSETTS

TURBINE-REGULATING DEVICE

Application filed February 13, 1929. Serial No. 339,717.

The principal objects of this invention are to provide a turbine which permits of less expensive construction than used heretofore; which eliminates the use of main shaft bearings in the water; in which the alignment of the main shaft bearings can be maintained; which can be operated continuously for considerable periods of time without attention for the purpose of adjustment; in which the stiffness of the main shaft can be maintained where it is reduced in diameter between bearings; in which all the main shaft bearings can be lubricated with oil, grease or other lubricating substance; having a slow moving gate so that dangers from water hammer are eliminated; the speed of which can be regulated without changing the rate of flow of water appreciably; in which a friction brake is used to absorb the superfluous power of the turbine without an appreciable change in the rate of flowing water, or of the speed of the rotating shaft; in which the rotating speed of the shaft can be kept fairly constant without the usage of devices for throttling the water supply; in which the rotating speed of the shaft and rate of flow of water can be maintained fairly uniform without throttling the water supply and without danger from excessive heating of the friction elements which absorb superfluous power and in which the end thrust is carried by a bearing which can be lubricated by oil or other suitable lubricating substance without interposing said bearing in the waterway.

Reference is to be had to the accompanying drawings in which

Fig. 1 is a longitudinal sectional view of a turbine embodying the features of this invention;

Fig. 2 is a lateral section on the line 2—2 of Fig. 1 showing the gate and gate operating mechanism;

Figs. 3 is a lateral section on the line 3—3 of Fig. 1 showing the friction producing mechanism for absorbing superfluous load, and Fig. 4 is a section taken on the line 4—4 of Fig. 1 through the guides.

The invention is shown in a form comprising a housing 10 having integral partitions forming spaces 11 for directing water from a source of supply into a runner 12. The water is delivered from this runner into an elbow 13 and is discharged therefrom. The elbow or discharge chamber is provided with a casing 14, integral therewith preferably, in which are bearings 15 for a main shaft 16 on which the runner 12 is fixed.

It will be seen therefore that this shaft 16 is supported outside the runway for the water and none of its bearings is located in water or where they can receive any water and thus they are not in a position to be attacked thereby. The bearings are protected from the water by packings 17 adjacent thereto and by another packing 18 in a groove which drains back into the elbow 13.

Located in the housing 10 beyond the end of the shaft 16 is an oscillatable disc 20 which is provided with openings adapted to register with the spaces 11 when the disc is turned to the right position. This disc is rotatably mounted on a stud 21 concentric with the shaft 16 and supported by a hub 22 constituting an integral part of the housing 10. This disc is adapted to be turned back and forth by a worm 23 arranged tangentially and meshing with worm wheel threads 24 on the circumference of the disc. It is turned by a handle 25 for adjustment to let as much or as little water through into the runner 12 as may be desired.

The bearings 15 are located on the shaft 16 at the ends of a tube 25 on the shaft. By means of a nut 26 on the shaft these two bearings, including the tube, can be pressed firmly against a shoulder 27 on the shaft. In this way the bearing of the shaft can be adjusted and tightened entirely away from the water which flows through the runner. The casing 14 provides the supporting means for mounting an electric generator 28. This construction makes the turbine and generator a combined and compact unit.

For this purpose brackets or projections 29 are provided on the casing 14 for supporting a platform 30 which carries the generator and also a housing 31 for protecting the generator from the weather or other damaging elements. The housing is shown in the drawings as comprising a circular shell and having a removable cover 32. On the generator shaft is a pulley 33 for driving the generator from the shaft 16 through a pulley 34 by means of a belt, but of course, any ordinary driving means can be used.

On the driving shaft 16 is fixed a collar 36. On the diametrically opposite sides of this collar are pivoted arms 37 which are integral with a couple of friction shoes 38. On both sides of a sliding collar 35 are springs 39 counteracting each other. On the end of the shaft is a sleeve 40 which backs up one of these springs and is slidable on the shaft. The longitudinal position of the collar 35 with respect to the shaft can be varied by applying pressure on this collar 40 through a screw 41 mounted in a casing 42 in fixed position on an intermediate casing 43—44 fixed to the casing 14.

The shoes 38 are arranged so that they can rub against a turned surface on the inside of the casing 42 to produce friction. The collar 35 is connected with the shoes 38 by inclined links 45. It will be seen that if the spring on the left is allowed to force the collar 35 away from the collar 36 to an excessive degree, the links 45 will prevent the shoes 38 from engaging the friction surface except under such a high speed that the centrifugal force acting through the inclined links 45 will compress the spring 39 at the left to a very high degree. Of course, the adjustment of the screw 41 will affect the pressure of this spring and consequently affect the speed of rotation of the shaft 16. The casing 42 is provided with a water jacket 46 into which water or other cooling agent is introduced through a pipe 47 and discharged through a pipe 48.

To operate the turbine water or other fluid is introduced into the chamber 10 flowing under pressure in the direction of the arrows. It passes through the openings in the disc 20 through the spaces 11 and through the runner 12 from which it discharges into the elbow or discharge chamber 13. The runner 12 is a turbine wheel of any desired character fixed on the shaft 16 to rotate the same by the action of the water passing through it. Thus it drives the generator and the current is employed for any desired purpose. Of course, this power can be used for other purposes than driving a generator as that is not a feature of the invention.

If the power output of the turbine exceeds the amount of power required the speed of the shaft 16 will increase. Therefore, the shoes 38, which ordinarily rotate within their friction surface without touching the same, will be thrown out and produce friction to retard the shaft 16. To do this they have to overcome the resistance of one of the springs 39. This friction uses the surplus power and prevents excessive speed. The limit of the speed being obtained is adjusted by the screw 41. This is adjusted so that when the turbine is giving the required speed and power the shoes will not touch the inner surface of the casing 42. This casing is protected as stated from overheating by means of the water jacket and any other cooling device can be substituted for that purpose.

It will be seen that the main shaft is supported at a point outside the course of water in the turbine and the bearings amply protected from moisture from that source with a convenient speed regulating device employed and that it can be used as a unit for mounting the motor in the position indicated. These facts make it suitable for use as a so-called Brook motor and is adapted especially for small sizes for developing power from brooks, pipe lines and other comparatively small sources of water supply, although I am aware of the fact that the principles herein can be used for larger sized installations.

This invention is not limited to the use of water as a motive power, as oil, steam, compressed air or gases would work also. The invention also is not limited to the horizontal type of turbine as many of the features of the invention could be employed with a turbine mounted vertically.

Although I have illustrated and described only one form of the invention I am aware of the fact that modifications can be made therein by any person skilled in the art without departing from the scope of the invention as expressed in the claims. Therefore, I do not wish to be limited in this respect but what I do claim is:—

1. In a turbine, the combination of a casing having a straight inlet and a curved outlet, a turbine runner located in said casing, a shaft on the extreme end of which said runner is supported, said shaft extending through the curved part of the casing and the casing having bearings outside the said outlet which constitute the sole support of said shaft; a housing having passages therethrough for conducting the water directly to the runner, an oscillatable disc having openings adapted to be turned for controlling the amount of water delivered through said passages, and a stud concentric with the shaft beyond its end on which said disc is pivoted.

2. In a turbine, the combination of a casing having an inlet and a curved outlet, a turbine runner located in said casing, a shaft on which said runner is supported, said shaft extending through the curved part of the casing and the casing having a single set of bearings outside the said outlet constituting the sole means for supporting said shaft, and means on the same end of the shaft and at the opposite side of the bearings for transmitting the power from the shaft to another element.

3. In a turbine, the combination of a casing having an inlet and a curved outlet with a turbine runner mounted in said casing, a shaft extending through the surface of the curved outlet and having two sets of bearings on said casing beyond the outlet and supporting said turbine runner on its end, a wheel on the shaft on the other side of the bearings and adjacent to one set for transmitting power therefrom, a stationary casing beyond said wheel and means carried by the shaft for producing friction on the inside of said casing, said last named means being centrifugally operated and adjustable to prevent the production of friction except when the shaft is rotating at more than normal speed.

4. In a turbine, the combination with a turbine runner and a shaft on the end of which it is mounted, said shaft having bearings near its center and a wheel on the other side of said bearings for transmitting the power from said shaft, a disc mounted on said shaft beyond said wheel, a pair of friction shoes at the end of the shaft opposite the runner and pivotally connected with the disc and adapted to be thrown outwardly by the centrifugal force of the shaft, a stationary casing having an internal friction surface for receiving the friction of said shoes and slowing up the shaft, yielding means for holding the shoes from engaging said friction surface and means for adjusting said yielding means.

5. In a turbine, the combination with a turbine runner and a shaft on which it is mounted, said shaft having bearings and a wheel on the other side of said bearings for transmitting the power from said shaft, a disc mounted on said shaft, a pair of friction shoes pivotally connected with the disc and adapted to be thrown outwardly by excessive rotation of the shaft, a stationary casing having an internal friction surface for receiving the friction of said shoes, and a water jacket surrounding said casing to prevent excessive heating.

6. The combination with a turbine and a shaft on which it is located at one end, of means for supporting the shaft near the center, a collar slidably mounted on the end of the shaft opposite the turbine, springs for holding the collar in central position, adjustable means for applying pressure on one of the springs to adjust the collar on the shaft, links connected with said collar and extending outwardly, shoes connected with said links, and a stationary circular surface against the interior of which said shoes are adapted to engage to apply friction to control the speed of the shaft.

In testimony whereof I have hereunto affixed my signature.

GEORGE A. BIGGS.